(12) United States Patent
Milkowski et al.

(10) Patent No.: US 9,522,482 B2
(45) Date of Patent: Dec. 20, 2016

(54) PREFORM FOR A PLASTIC CONTAINER, AND THE PREFORM HOLDER

(75) Inventors: Bogumil Milkowski, Gdansk (PL); Dariusz Lewandowski, Warsaw (PL); Andzej Toborowicz, Warsaw (PL)

(73) Assignee: INVENTO SP. Z O.O., Warszawa (PL)

( * ) Notice: Subject to any disclaimer, the term of this patent is extended or adjusted under 35 U.S.C. 154(b) by 273 days.

(21) Appl. No.: 12/746,298

(22) PCT Filed: Dec. 3, 2008

(86) PCT No.: PCT/PL2008/000093
§ 371 (c)(1),
(2), (4) Date: Nov. 24, 2010

(87) PCT Pub. No.: WO2009/072910
PCT Pub. Date: Jun. 11, 2009

(65) Prior Publication Data
US 2011/0076433 A1    Mar. 31, 2011

(30) Foreign Application Priority Data

Dec. 5, 2007 (PL) .................................. 383951
Nov. 15, 2008 (PL) .................................. 386525

(51) Int. Cl.
*B29B 11/14* (2006.01)
*B29C 49/42* (2006.01)

(52) U.S. Cl.
CPC ............ *B29B 11/14* (2013.01); *B29C 49/4205* (2013.01); *B29B 2911/1402* (2013.01);
(Continued)

(58) Field of Classification Search
CPC ............... B65D 1/00; B65D 1/02; B65D 1/16; B65D 1/42; B29C 49/00; B29C 49/06; B29C 49/58; B29D 22/00; B29B 11/14; B29B 2911/1402; B29B 2911/14026; B29B 2911/14033; B29B 2911/1404; B29B 2911/14106; B29B 2911/14326; B29B 2911/14333; B29B 2911/1434; B29B 2911/14366; B29B 2911/144; B29B 2911/1442; B29B 2911/14473; B29B 2911/14606
(Continued)

(56) References Cited

U.S. PATENT DOCUMENTS 3,961,113 A * 6/1976 Marco ..................... 428/36.92
4,518,097 A * 5/1985 Milton et al. ............. 220/782
(Continued)

FOREIGN PATENT DOCUMENTS

DE   19924827   * 10/2000 ............... B65D 1/02
EP   0482652    4/1992
(Continued)

OTHER PUBLICATIONS

International Search Report dated Aug. 11, 2009 from the corresponding PCT/PL2008/000093.

*Primary Examiner* — Fenn Mathew
*Assistant Examiner* — Elizabeth Volz
(74) *Attorney, Agent, or Firm* — Katten Muchin Rosenman LLP

(57) ABSTRACT

The invention concerns a preform for a plastic container in the form of a can intended particularly for pressurized beverages, and the preform holder in the container manufacturing process. The preform (10) consists of a body (1) with a neck (3) ended with a thin outer flange (4). A supporting flange (6) is formed on the inner wall of the neck (3*a*), while the outer surface of the neck (3*b*) is even. The preform holder comprises a body (11) provided with pockets (13). The pockets seat mobile-anchored clasps (14) which are clamped on the body (11) with an elastic clamping ring
(Continued)

(15). The clasps (14) each ends with a tooth (16) which extends over the seat (17) where the thin outer flange (4) of the preform (10) rests. The inner side wall of the seat (17) has a groove (19) carved in it to accommodate the supporting flange (6) of the preform (10).

10 Claims, 9 Drawing Sheets

(52) U.S. Cl.
CPC . *B29B 2911/144* (2013.01); *B29B 2911/1404* (2013.01); *B29B 2911/14026* (2013.01); *B29B 2911/14033* (2013.01); *B29B 2911/1434* (2013.01); *B29B 2911/1442* (2013.01); *B29B 2911/14106* (2013.01); *B29B 2911/14326* (2013.01); *B29B 2911/14333* (2013.01); *B29B 2911/14366* (2013.01); *B29B 2911/14473* (2013.01); *B29B 2911/14606* (2013.01); *Y10T 428/1397* (2015.01)

(58) Field of Classification Search
USPC .... 220/657, 670; 428/36.92, 98, 167, 542.8; 264/250, 526, 535, 537, 571, 573, DIG. 66; 215/6; 425/388, 393, 403, 528; 269/254 R See application file for complete search history.

(56) References Cited

U.S. PATENT DOCUMENTS

| | | | |
|---|---|---|---|
| 4,536,150 A | 8/1985 | Smith | |
| 4,576,843 A * | 3/1986 | Beck | B29C 49/08 |
| | | | 215/373 |
| 4,641,758 A | 2/1987 | Sugiura | |
| 6,273,705 B1 | 8/2001 | Schoch | |
| 2002/0125259 A1* | 9/2002 | Nakamura et al. | 220/623 |
| 2005/0127024 A1 | 6/2005 | Darr | |
| 2005/0139569 A1* | 6/2005 | Larsen et al. | 215/44 |
| 2007/0090118 A1* | 4/2007 | Milkowski et al. | 220/657 |
| 2007/0292642 A1* | 12/2007 | Ungrady et al. | 428/35.7 |

FOREIGN PATENT DOCUMENTS

| | | | |
|---|---|---|---|
| GB | 2137923 | 10/1984 | |
| JP | 2004268570 | 9/2004 | |
| WO | WO9744601 | * 11/1997 | F16J 9/08 |
| WO | 0238353 | 5/2002 | |
| WO | 2005049434 | 6/2005 | |

* cited by examiner

PREFORM FOR A PLASTIC CONTAINER, AND THE PREFORM HOLDER

The invention concerns a preform for a plastic container in the form of a can intended particularly for pressurised beverages, and the preform holder in the container manufacturing process.

In the container manufacturing process preforms are carried in the blow moulding machine on special pick-up plugs, locked in place and sealed tight in the blow mould.

WO2005049434 disclosed a preform for a plastic container, comprising the body with a convex hemispherical bottom, wherein the body conical in shape opens upwards to form a cylindrical neck ending in an outwardly-extending flange terminated with a profile rim. The flange is less than 0.3 mm thick, which is required for the good seaming of the metal lid on the finished container.

EP 0 482 652 disclosed a cylindrical preform ending with an outwardly extending flange thicker than 0.3 mm, and the method of manufacturing a container out of this perform. Under this method the perform is, in the process of container forming, locked in position and sealed tight in the blow mould by locking the outer flange in the blow mould seat. The method can only apply to preforms with flanges of a substantial thickness, which will not be deformed under the external forces affecting them during the preform blowing process.

The disclosed methods of locking and sealing the perform tight in the blow-mould by locking the outer flange are inappropriate for a preform with a thin, less than 0.3 mm thick, outer flange. The thin flange will not resist the forces which affect the preform during the blowing process adequately; hence it will get deformed or damaged. Containers with damaged or deformed flanges are rejected.

WO0238353 disclosed a preform pick-up plug fitted with a clamping member which presses against the inner surface of the preform in effect of a spring member acting on the clamping member. In this way the preform is supported in the desired position when in transport in the blow-moulding machine.

The pick-up plug is only fit for transporting preforms in the blow-moulding machine because of non-existence of any elements that would seal and hold the preform in the blow-mould during the container-forming process.

The present invention solves the issue of protecting the thin outer flange of the preform from damage in the process of blowing it into a can-shape container which upon filling is sealed in the process of seaming the flange and the metal lid on traditional machines designated for lidding metal cans.

The problem has been solved by developing the inner wall of the preform neck and designing the preform holder so as to ensure that the preform shall retain the proper position whilst in transport in the blow-moulding machine, will be locked in place and sealed tight during the process of forming it into a container.

According to the invention, the preform consisting of a conically-shaped body with a convex bottom and—at the other end—merging directly into a cylindrical neck which ends with a thin outer flange extended outward away from the body, is characterised by the fact that a supporting flange is formed on the inner wall of the neck below the top rim, while the outer wall of the neck remains even. Preferably, the supporting flange is formed at least 1.5 mm below the top rim.

In addition, below the first supporting flange another supporting flange or several other supporting flanges are formed bottom-wise on the inner wall of the preform neck.

According to variant one of the invention, the preform holder fitted with elastic and clamping members is characterised by having a body with an axially running air duct through which air is blown into the preform, and the outer side walls of the body provided with pockets which seat mobile-anchored clasps held tight in position over the body with an elastic clamping ring. The clasps each ends with a tooth which reaches over the seat formed in the front wall of the holder where the thin outer flange of the preform rests. In between the tooth bottom and the seat a crevice is formed into which the rim of the flange slips. A groove is carved in the inner side wall of the seat to hold the fitting supporting flange of the preform. In case of preforms fitted with two or more supporting flanges the side wall of the seat will have several grooves carved as appropriate to hold the supporting flanges of the preform.

The elastic clamping ring is preferably made of rubber. Preferably, the elastic clamping ring is mounted at about half the height of the clasp.

The elastic clamping ring is preferably mounted in a recess formed in the clasp and/or the side wall of the body.

In order to reduce the maximum angle at which the tooth deflects from the closed position the lower section of the clasp below the clamping ring curves towards the body, or a distance element is additionally formed below the elastic clamping ring on the inner side wall of the clasp and/or the side wall of the body.

According to variant two of the invention, the preform holder is characterised in that the body with an axially running air duct through which air is blown into the preform, a slidable clamp bushing is embedded, fitted with an elastic ring which locks the preform mating with the body and the inner wall of the preform neck equipped with a supporting flange or flanges. The clamp bushing is submitted to the action of a spring which mates with a piston mounted in the body. The piston is submitted to a force which causes the sliding of the clamp bushing, in effect of which the preform is released from the lock in the holder.

The piston is subject to the force of compressed air driven in through an opening made in the holder body; alternatively the piston is moved using a pin which exerts axially-oriented force on the piston.

The preform locking ring is preferably made of rubber.

The fact that the supporting flange is located below the preform neck rim does not obstruct seaming the thin outer flange of the finished container with the metal lid on a typical packing line designated for metal cans. With an additional supporting flange or several supporting flanges in place the preform is locked better and sealed tighter in the blow-mould, subject to increased pressure present whilst it is formed into a container.

According to the invention, the preform holder prevents dislocation of the preform and ensures it is held in the proper position when in transport in the blow-mould machine; in the preform blowing process the arm ensures the preform is properly locked in place and sealed tight in the blow-mould owing to the fact that the supporting flange or flanges of the preform are locked in the groove or grooves formed in the holder body.

The invention enables manufacturing of a plastic, can-shaped container with smooth walls on the outside and a thin outer flange which seals tight when seamed with a metal lid.

The invention will now be described by way of example with reference to the accompanying drawings where:

Figure 10:
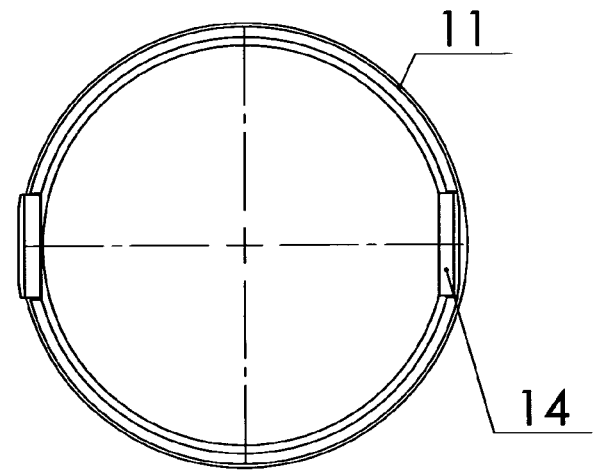
Figure 11:
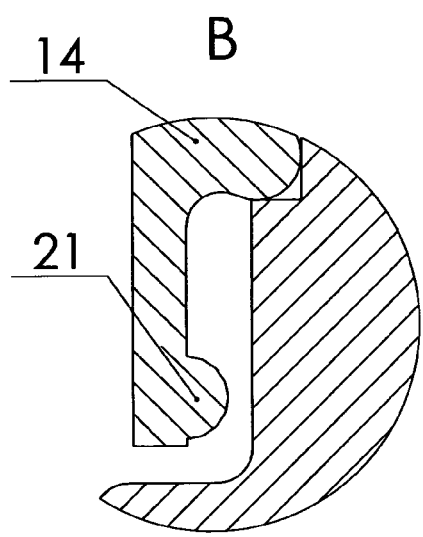
Figure 12:
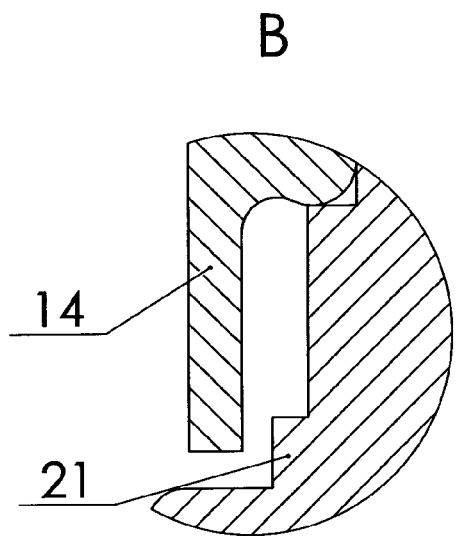
Figure 13:
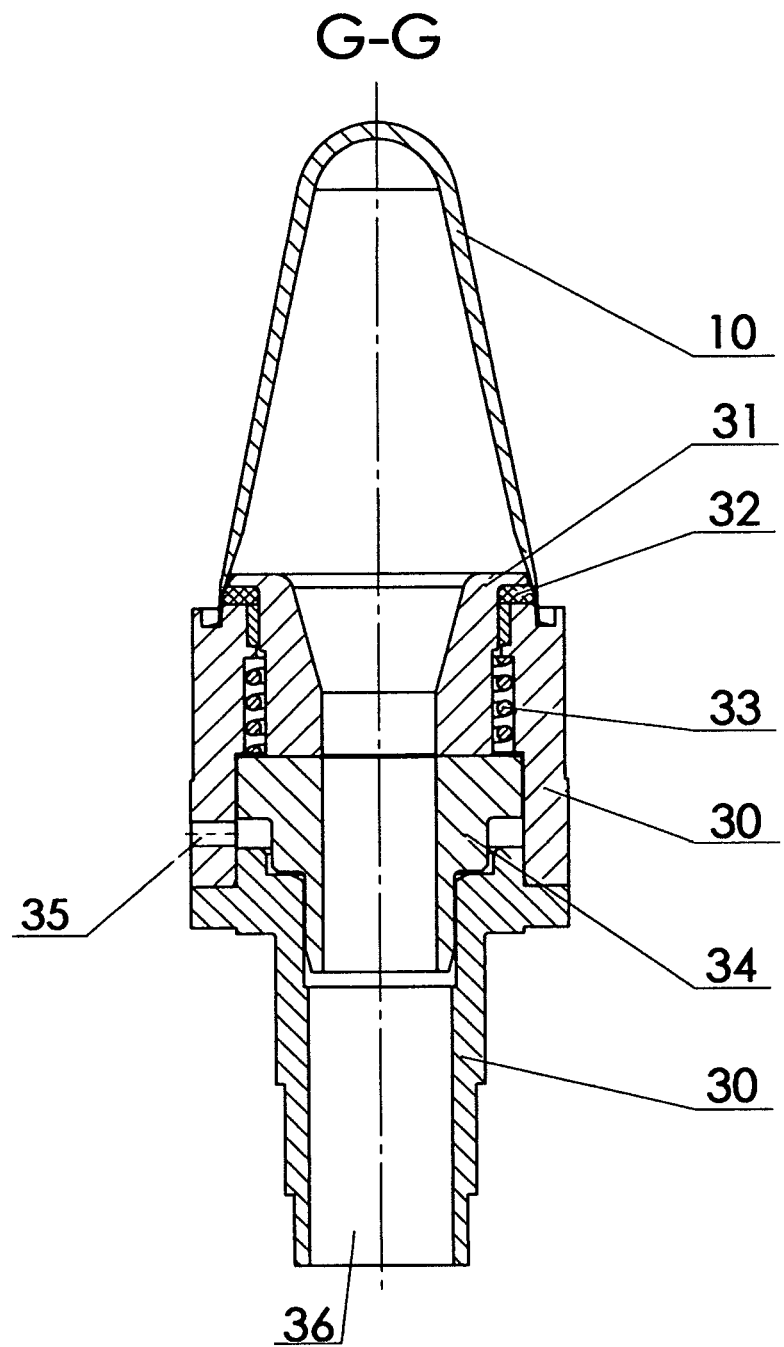
Figures 14, 15:
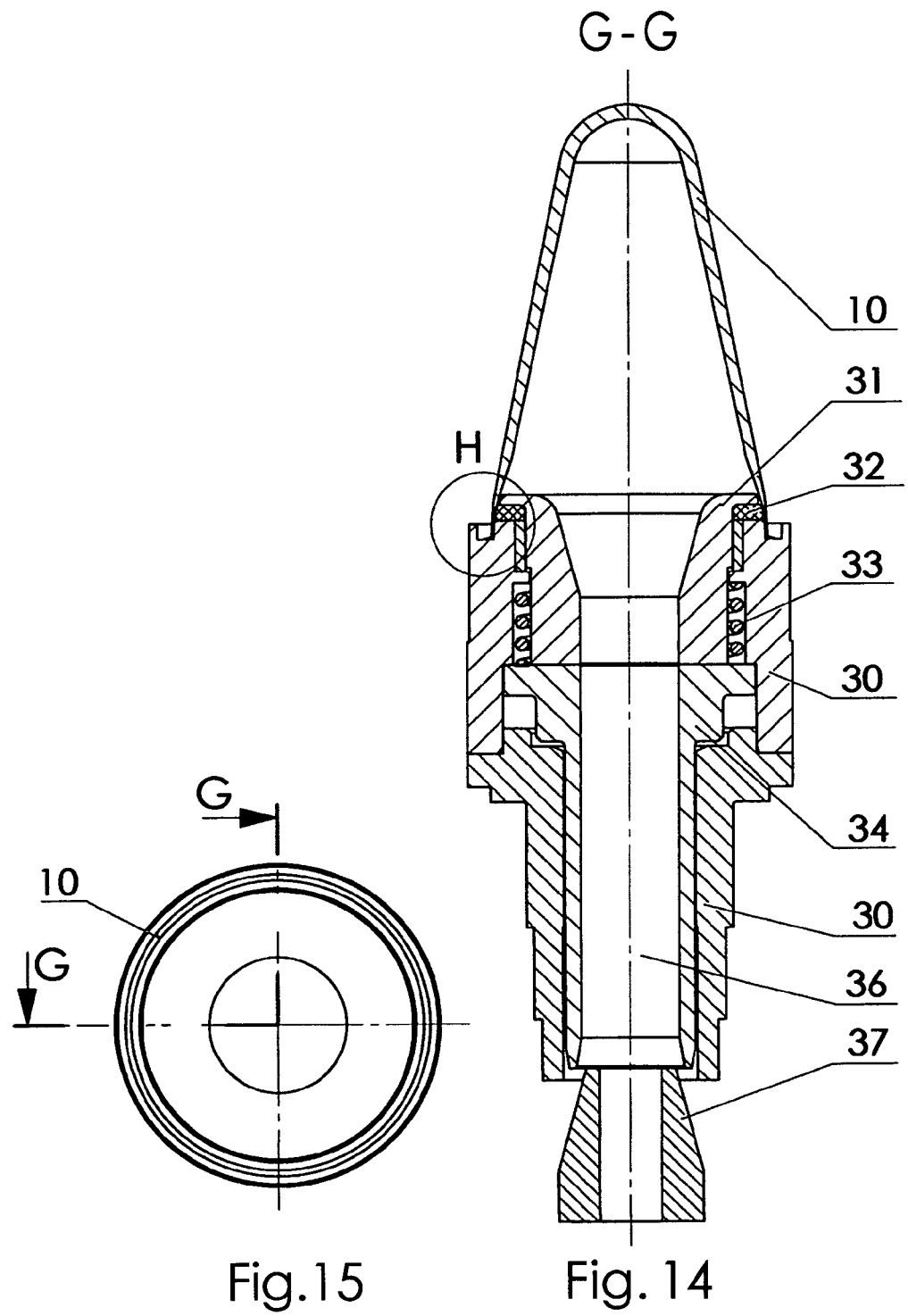
Figure 16:
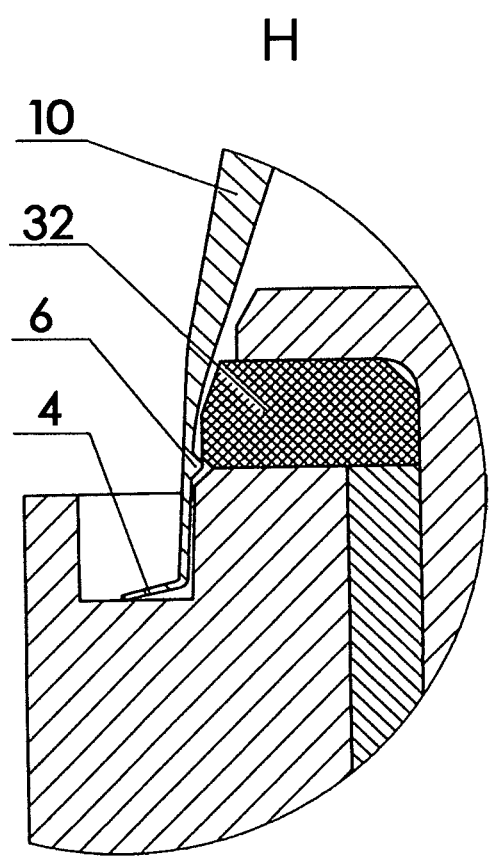
Figure 17:
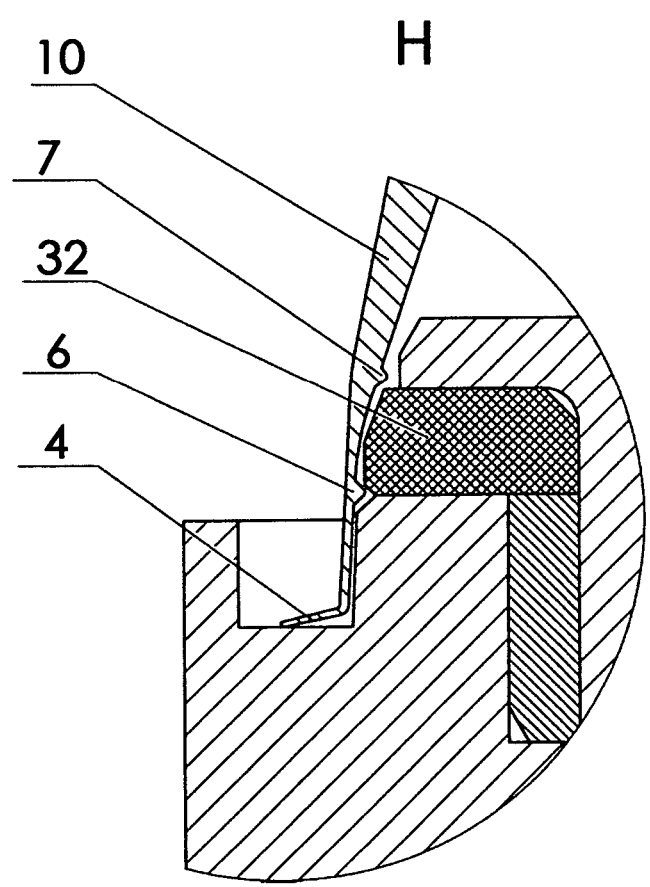
Figure 18:
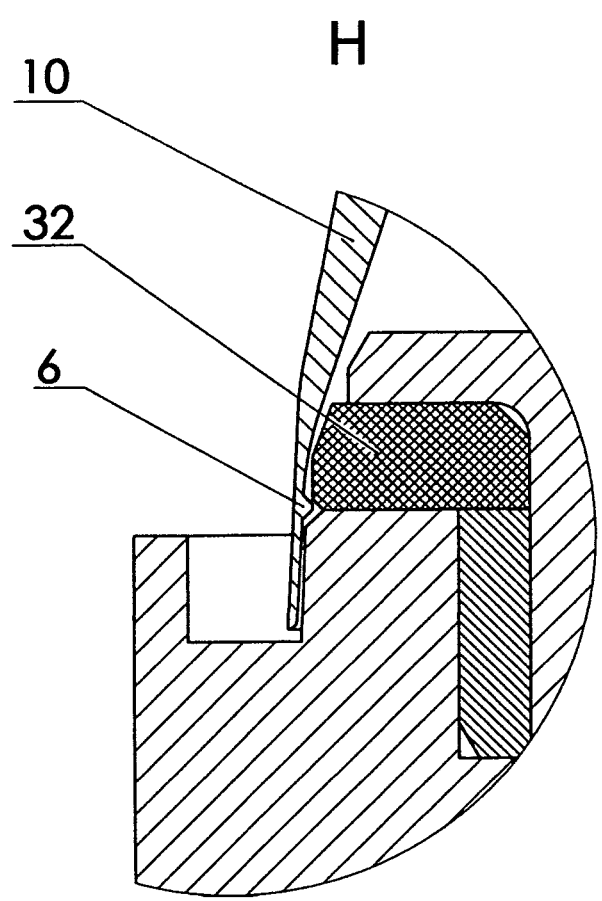

FIG. 10 shows the preform holder with a preform thereon seen from above; the clasps are in the closed position FIG. 11 shows a fragment of a clasp mounted in the preform holder, in the version where the distance element is formed on the clasp surface FIG. 12 shows a fragment of a clasp mounted in the preform holder, in the version where the distance element is formed on the surface of the holder body FIG. 13 shows the axial section of the preform holder holding the preform, in the variant with the air duct for driving compressed air under the piston FIG. 14 shows the axial section of the preform holder holding the preform, in the variant with the pin operating the piston FIG. 15 shows the preform holder with a preform thereon seen from above FIG. 16 shows a fragment of the preform holder holding the preform, in the axial section FIG. 17 shows a fragment of the preform holder holding a preform with an additional supporting flange, in the axial section FIG. 18 shows a fragment of the preform holder holding a preform without the outer flange, in the axial section.

Figure 1:
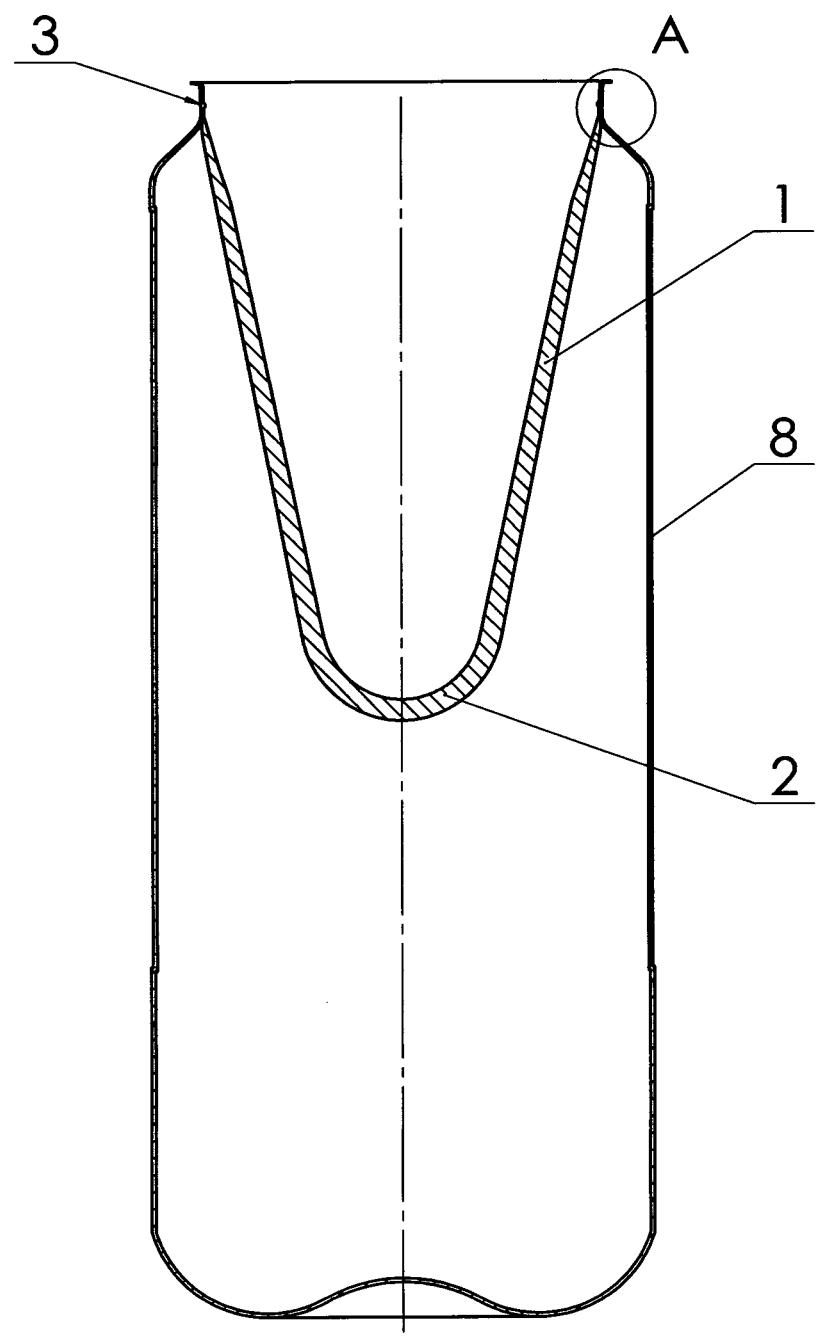
FIG. 1 shows the axial section of the preform already transformed into a can
Figure 2:
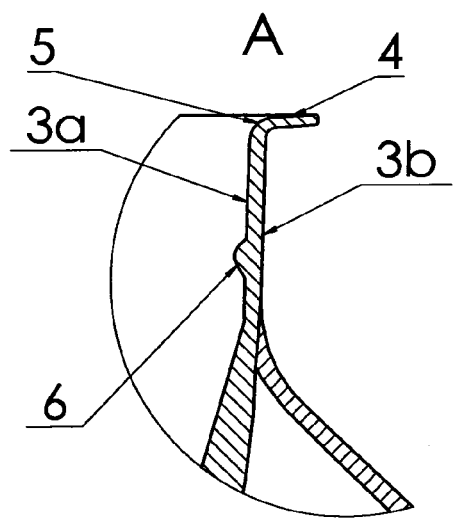
FIG. 2 shows the axial section of the preform neck and a supporting flange
Figure 3:
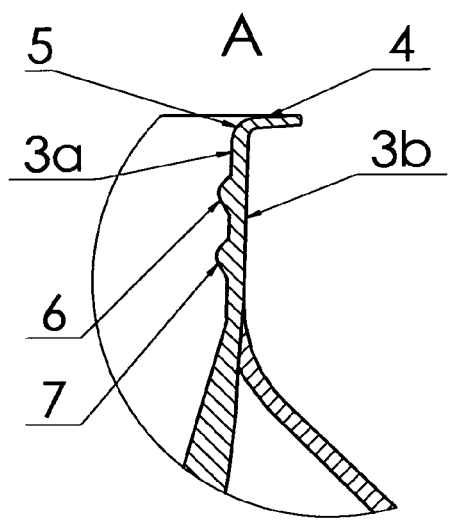
FIG. 3 shows the axial section of the preform neck with two supporting flanges

According to the invention, as shown on FIG. 1, the preform 10 consists of a conical body 1 with a convex bottom 2. Opposite the bottom 2 the body 1 merges directly into a cylindrical neck 3, whose inner wall 3a, about 3 mm below the top rim 5 has a supporting flange 6, while the outer neck wall 3b is even. The cylindrical neck 3 ends with a thin, less than 0.3 mm thick, outer flange 4 extending outwardly virtually perpendicular to the side wall as shown on FIG. 2. In another version, as shown on FIG. 3, the preform has an additional supporting flange on the inner wall of the neck 3a, formed bottom-wise below the supporting flange 6.

Figure 4:
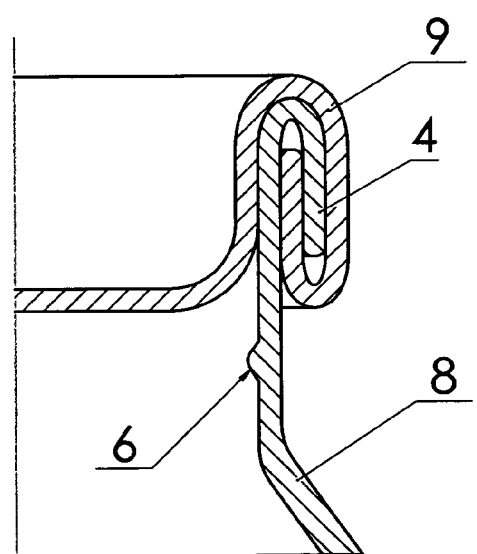
FIG. 4 shows a cross-section of the container neck with the seamed lid
Figure 5:
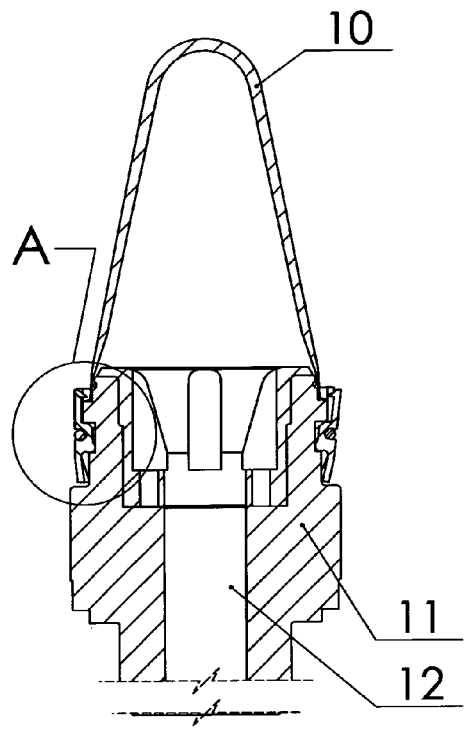
FIG. 5 shows the axial section of the preform holder holding the perform
Figure 6:
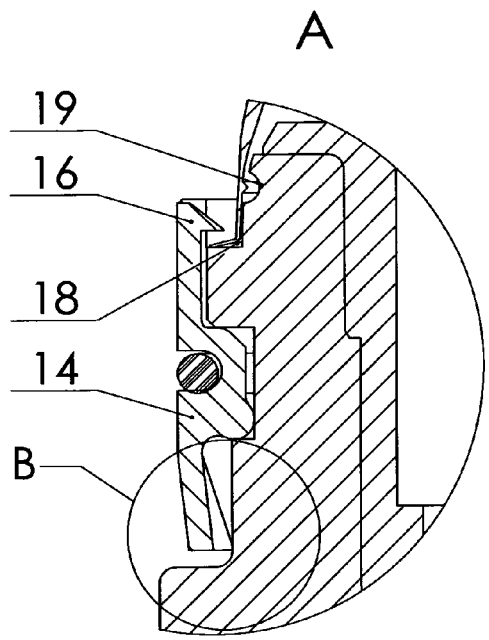
FIG. 6 shows a clasp mounted in the preform holder, with a fragment of the axially depicted preform in the closed position
Figure 7:
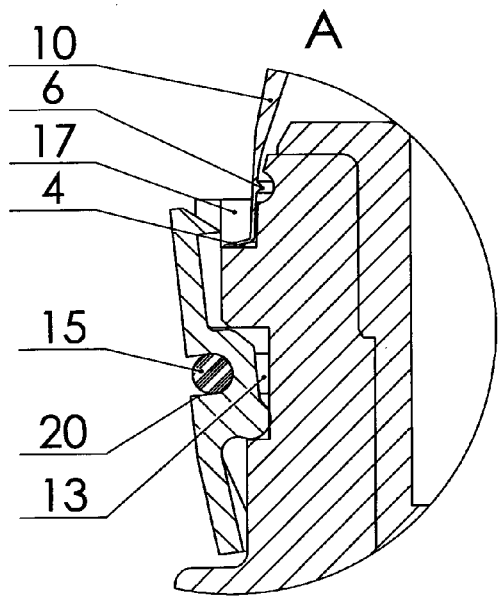
FIG. 7 shows the clasp mounted in the preform holder with a fragment of the preform depicted axially in the open position
Figure 8:
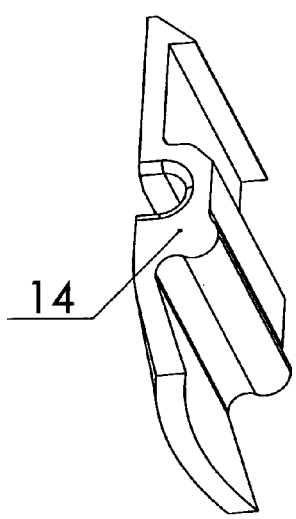
FIG. 8 shows a clasp in the axonometric view, in the versions depicted on FIGS. 6 and 7
Figure 9:
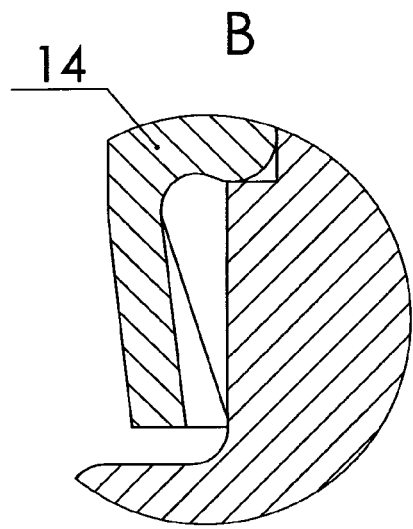
FIG. 9 shows a fragment of the clasp mounted in the preform holder for the version depicted on FIG. 6-8

The preform shape of a cone merging directly into a cylindrical neck 3 is optimal for obtaining a thin outer flange 4 with advantageous strength parameters which, in a finished can 8, is seamed with a metal lid 9 as shown on FIG. 4.

According to variant one of the invention the preform holder is composed of a body 11 with an axially running air duct through which air is blown 12 into the preform 10. The outer side walls of the body 11 are provided with pockets 13 seating mobile-anchored clasps 14 which are clamped on the body 11 with an elastic clamping ring 15. The clamping ring 15 is mounted in a recess 20 formed at approximately mid-height of the clasp 14 and the side wall of the body 11.

The seat 17 where the thin outer flange 4 of the preform 10 rests is formed in the front wall of the body 11. The clasps 14 each ends with a tooth 16 which reaches over the seat 17 forming a crevice 18 between the tooth bottom 16 and the seat 17 where the thin outer flange 4 of the preform 10 is inserted to prevent its dislocation whilst in transport to the blow-moulding machine. The inner side wall of the seat 17 has a groove 19 carved in it to fit the supporting flange 6 of the preform 10. In the blowing process the mould presses the preform 10 wall 3b around the supporting flange 6 to the holder's body 11 thus preventing any undesirable dislocation of the preform 10. After the container 8 has been formed and transported to the designated place the clasp 14 is released as the result of the pressure on its side wall below the elastic clamping ring 15 towards the side wall of the body 11. This causes that the tooth is deflected 16 from the surface of the body 11 and in effect the thin outer flange 4 of the container 8 formed from preform 10 becomes unlocked, and the container 8 can be taken off the holder.

In order to reduce the maximum angle at which the tooth 16 deflects from the closed position the lower section of the clasp 14 curves towards the side wall of the body 11 as shown on FIG. 6 to 9. In another execution, as shown on FIG. 11, a distance element 21 is formed below the elastic clamping ring 15 on the inner side wall of the clasp 14. Yet another version envisages the distance element 21 as formed on the outer side wall of the body 11, as shown on FIG. 12. In case of a preform equipped with an additional supporting flange 7 the inner side wall of the seat 17 has an additional groove carved to accommodate the extra supporting flange 7 of the preform 10.

In case of a preform fitted with several additional supporting flanges the inner side wall of the seat 17 will have several grooves carved as appropriate to hold the additional supporting flanges of the preform.

According to variant two of the invention, as shown on FIG. 13, the preform holder has a body 30 with an embedded, slidable clamp bushing 31 fitted with an elastic locking ring 32 which mates with the body and the inner walls of the preform neck 3a equipped with a supporting flange 6. The clamp bushing 31 is submitted to the action of a spring 33 which mates with the piston 34 mounted in the body. The piston 34 is subject to the force of compressed air driven in through an opening 35 made in the body 30, which causes the sliding of the clamp bushing 31 and the release of the preform from the lock in the holder. The holder has an axially running air duct 36 through which air needed to blow the preform is supplied.

In another execution, as shown on FIG. 14, the piston 34 movement is achieved via a pin 37 which exerts axially-oriented force on the piston 34. The preform 10 is held in the holder whilst in the blow-moulding machine thanks to the strained elastic locking ring 32, which presses on the inner side wall of the preform 3a fitted with a supporting flange 6. The strain of the elastic locking ring 32 is the effect of the pressure from the clamp bushing 31, and this is built by the piston 34 subject to the action of the spring 33. The supporting flange 6 on the inner wall of the preform neck 3a prohibits any axial movement of the elastic locking ring 32, thus preventing the blowing of the preform out of the blow-mould in the can formation process. The thin outer flange 4 of the preform 10 does not transmit any forces in the formation process, and is therefore effectively protected against damage.

In the preform variant equipped with an additional supporting flange 7, the elastic locking ring 32 fits in between the supporting flange 6 of the preform and the additional supporting flange 7, which strengthens the lock and tightens the preform sealing in the blowing process and facilitates positioning of the preform when slipping it onto the holder as shown on FIG. 17.

While the preform 10 is being slipped on the holder, or the can is being slipped off after the blowing, air is delivered to the opening 35 at a specific pressure. The air pressure pushes the piston 34 up, thus lifting the pressure of the clamp bushing 31 on the elastic locking ring 32. With no pressure on the elastic locking ring 32 no force acts on the inner walls of the preform neck 3*a*. This makes it easy to slip the preform on the holder and slip the formed container off the holder. In another execution of the invention, the release of the pressure from the clamp bushing 31 on the elastic locking ring 32 is achieved by making use of a pin 37 which moves the piston 32; the spring 33 presses on the clamp bushing 31 causing its shift towards the preform bottom.

While the preform 10 is undergoing the process of transformation into the ready product in the blow-mould, the elastic locking ring 32 gets additional downward pressure from the air driven into the preform to blow it; the air exerts pressure on the top surface of the clamp bushing 31.

The preform holders according to the invention can also be used to hold and seal tight preforms with no outer flanges in the blowing process, which is shown on FIG. 18.

The invention claimed is:

1. A preform for a plastic container comprising of a conically-shaped body with a convex bottom and at an opposite end—merging directly into a cylindrical neck which ends with a top rim having a thin outer flange extended outward away from the conically-shaped body, wherein a supporting flange is formed extending inward around and from the circumference of an inner wall of the cylindrical neck below the top rim to form a circular closed ring, while an outer wall of the cylindrical neck is entirely even,
   sidewalk of the conically-shaped body and sidewalls of the convex bottom have a same slope,
   wherein a thickness of the cylindrical neck increases at a location of the supporting flange, and
   wherein the supporting flange is used to secure the preform to a preform holder during a preform blowing process.

2. The preform as claimed in claim 1, wherein the supporting flange is formed at least 1.5 mm below the top rim.

3. The preform as claimed in claim 1, wherein an additional supporting flange is formed below the first supporting flange extending inward around the circumference of the inner wall of the cylindrical neck.

4. The preform as claimed in claim 3, wherein the additional supporting flange is separated from the first supporting flange by a predetermined distance.

5. The preform as claimed in claim 1, wherein a plurality of additional supporting flanges are formed below the first supporting flange, wherein the plurality of additional supporting flanges extend inward around and from the circumference of the inner wall of the cylindrical neck.

6. The preform as claimed in claim 5, wherein the plurality of additional supporting flanges are separate from each other and the first supporting flange.

7. A preform for a plastic container comprising of a conically-shaped body with a convex bottom and at an opposite end—merging directly into a cylindrical neck which ends with a top rim having a thin outer flange extended outward away from the conically-shaped body, wherein a supporting flange is formed extending inward from an inner wall of the cylindrical neck below the top rim, while an outer wall of the cylindrical neck is entirely even,
   wherein sidewalls of the conically-shaped body and sidewalls of the convex bottom have a same slope,
   wherein the supporting flange forms a circular closed ring,
   wherein a thickness of the cylindrical neck increases at a location of the supporting flange, and
   wherein the supporting flange is used to secure the preform to a preform holder during a preform blowing process.

8. The preform as claimed in claim 7, wherein the supporting flange is formed at least 1.5 mm below the top rim.

9. The preform as claimed in claim 7, wherein an additional supporting flange is formed below the first supporting flange extending inward from the inner wall of the cylindrical neck.

10. The preform as claimed in claim 7, wherein a plurality of additional supporting flanges are formed below the first supporting flange extending inward from the inner wall of the cylindrical neck.

* * * * *